United States Patent
Bromberek

(10) Patent No.: US 7,118,157 B1
(45) Date of Patent: Oct. 10, 2006

(54) BOLT-ON TARPING SYSTEM

(76) Inventor: Robert Bromberek, 20 W 040 Bluff Rd., Lamont, IL (US) 50439

( * ) Notice: Subject to any disclaimer, the term of this patent is extended or adjusted under 35 U.S.C. 154(b) by 0 days.

(21) Appl. No.: 11/137,904

(22) Filed: May 26, 2005

(51) Int. Cl.
*B60P 7/02* (2006.01)

(52) U.S. Cl. .............................. 296/100.01; 296/100.14

(58) Field of Classification Search .................. 296/98, 296/100.14, 100.01, 100.11
See application file for complete search history.

(56) References Cited

U.S. PATENT DOCUMENTS

| | | | |
|---|---|---|---|
| 4,157,202 A | 6/1979 | Bachand | |
| 4,874,196 A | 10/1989 | Goldstein et al. | |
| 5,238,287 A * | 8/1993 | Haddad, Jr. ................... | 296/98 |
| 5,482,347 A * | 1/1996 | Clarys et al. ................... | 296/98 |
| 5,752,735 A * | 5/1998 | Fleming et al. ................ | 296/98 |
| 5,803,528 A | 9/1998 | Haddad | |
| 5,829,819 A * | 11/1998 | Searfoss ........................ | 296/98 |
| 5,944,374 A * | 8/1999 | Searfoss ................. | 296/100.14 |
| 6,109,680 A * | 8/2000 | Horner et al. ................. | 296/98 |
| 6,250,709 B1 | 6/2001 | Haddad | |
| 6,464,283 B1 | 10/2002 | Haddad | |
| 6,575,519 B1 | 6/2003 | Henning | |
| 6,695,382 B1 | 2/2004 | Ciferri et al. | |
| 6,742,828 B1 | 6/2004 | Smith | |
| 2004/0135392 A1 * | 7/2004 | Chabot ......................... | 296/98 |
| 2005/0173940 A1 * | 8/2005 | Smith et al. ........... | 296/100.01 |
| 2006/0043754 A1 * | 3/2006 | Smith .......................... | 296/98 |

OTHER PUBLICATIONS

Pioneer Cover-All, catalog titled "Pioneer of the Only Telescoping Low-Arm", 1995, 6 pages.
O'Brian Manufacturing, catalog for The Magnum Tarper, 4 pages.
Pioneer Cover-All, catalog for Rack 'N Pinion Tarping Systems, 4 pages.
Donovan Enterprises, catalog of tarping systems, pp. 26-30.
Donovan Enterprises, Mantis catalog, 6 pages.
Mountain Tarp, Tarp-N-Go catalog, 6 pages.
Mountain Tarp, Flip tarp catalog, 8 pages.

* cited by examiner

*Primary Examiner*—Lori L. Coletta
(74) *Attorney, Agent, or Firm*—Andrew & Casson, Ltd.; Heather A. Wakefield

(57) ABSTRACT

A bolt-on covering system kit for a transport container on a vehicle comprising a bolt-on axle bolted to the underside of the vehicle, two straight, adjustable telescopic arms sharing the bolt-on axle, an electric hydraulic pump, and a control unit. This bolt-on covering system allows for easy installation of a covering system with no need for welding or extensive fabrication work to mount such a system. With a bolt-on system, repairs are easy and the system can be easily removed or added to any transport container.

9 Claims, 6 Drawing Sheets

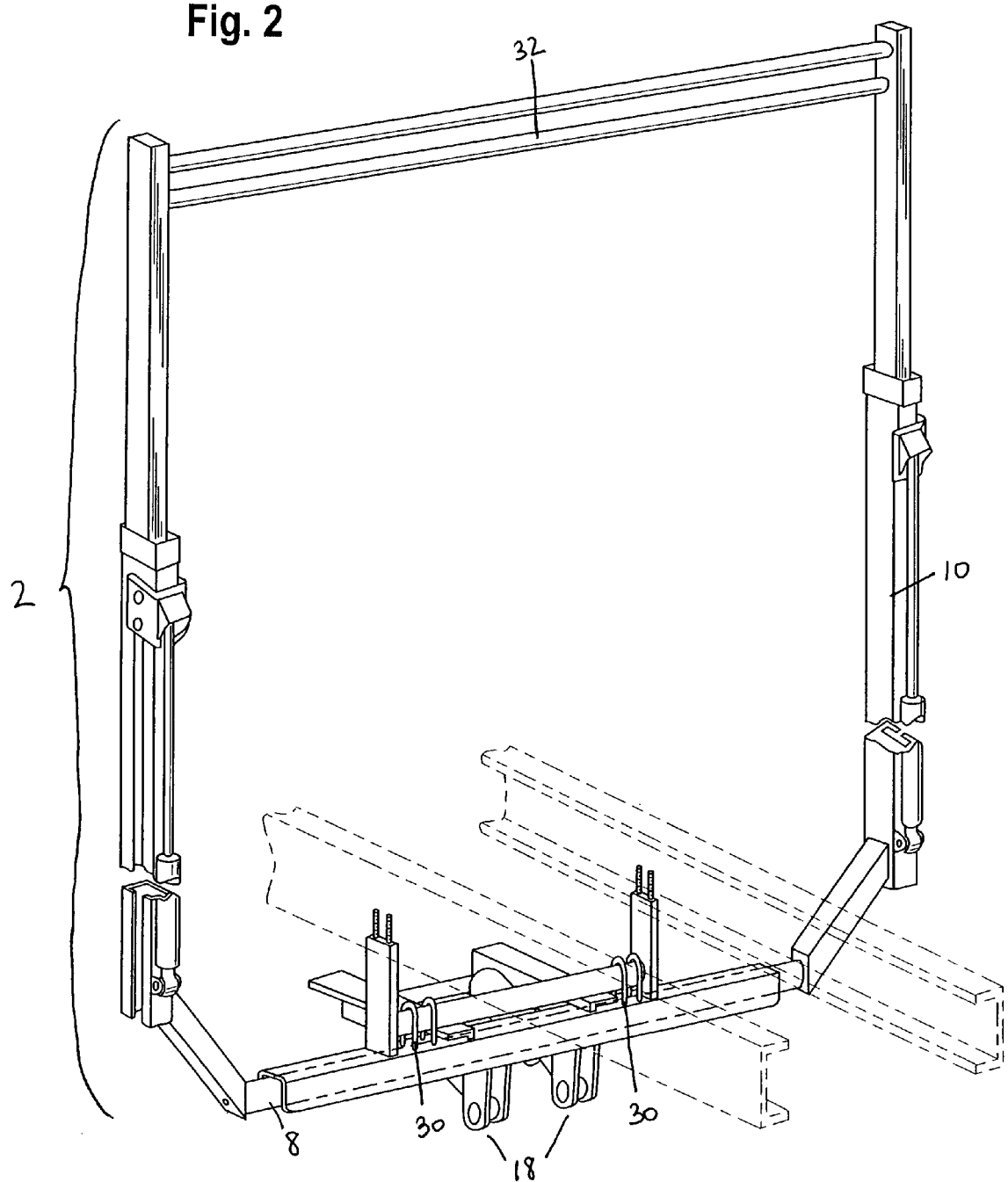

BOLT-ON TARPING SYSTEM

FIELD OF INVENTION

This invention relates to a covering system for transport containers on a vehicle. More specifically, it relates to a bolt-on covering system kit in which all parts are bolted onto the vehicle and there is no need for welding or fabrication when fitting a covering system to a vehicle.

BACKGROUND OF INVENTION

Transport containers, especially those used on trucks to haul large loads are typically open at the top. Being open at the top makes the transport containers easier to fill. However, while they may be easier to fill, these transport containers are also prone to losing part of the load while the vehicle is traveling. Debris can escape causing possible damage to other vehicles or other safety concerns. As a result, these transport containers must be covered.

Many transport containers are covered by large tarps that hold the load in place. Some of these tarps must be fitted manually to a transport container using a system of fasteners and ropes and other ties. This manual process of applying a cover to a transport container is very difficult and time consuming. A user often times will struggle to cover a load that is very large. This manual process can also be dangerous for a user and many safety concerns are realized while utilizing a manual process. Furthermore, a user must physically tighten the ties to ensure that the tarp is secure. This method of covering a transport container is simply too labor intensive and grueling for most users. As a result, covering systems utilizing a mechanical method have been developed to meet a growing demand.

Many of the mechanical covering systems utilize varying types of automatic systems to unroll a tarp over the transport container. Most of these more mechanical systems require major fabrication work to mount and to have the system work properly. Some systems utilize telescopic arms that unroll a tarp over a transport container as the arms expand. These same arms can then contract to roll the tarp when it is not needed. Other systems use straight arms that bend at a joint to either unroll or roll a tarp as needed. However, while these systems save a user time in covering a transport container, they are very labor intensive in fitting a system like this onto a vehicle. Typically these mechanical involve extensive welding of parts to the vehicle. This process can take days to complete. Furthermore, because of these welded parts, these systems can be very difficult to remove from a vehicle and can be challenging to repair.

These more mechanical systems also have other problems besides the challenge of welding the system to a vehicle. Some utilize a tarp roller that extends high above the transport container. Most vehicles that haul transport containers are large vehicles that must deal with height restrictions. By adding too much to the height of a transport container, serious travel problems may occur. Another problem facing those systems utilizing bent arms is that many of the covering systems arms pose the problem of the arms protruding over the top of short or low transport containers. Yet another problem still is that some systems utilize arms that are not adjustable in length or height. This poses trouble again for low or short transport containers because the tarp will not be secure over the load or the tarp may overhang the transport container increasing the vehicle's length. Another added difficulty is that many of these systems also require that a vehicle be running to operate the covering system.

Existing systems do not utilize a shared axle connecting the arms. A problem with this is that sometimes the right and left arms will not move together at the same rate of speed and the tarp will unroll or roll up unevenly.

This invention solves all of these above mentioned problems. This invention comprises an entirely bolt-on covering system for covering a transport container. This invention is mounted under a vehicle rather then high up on the vehicle or on the fenders. This bolt-on covering system kit does not utilize welding or fabrication. Since all the parts are bolted onto a vehicle, this system takes only a short time to fit a vehicle. Furthermore, when the system needs to be removed or repaired, the parts can be easily removed or changed. This bolt-on covering system kit is designed to be adjustable so that all transport containers will be properly fitted. Low or short vehicles will not suffer from added height or from unsecured loads. Another advantage is that this system utilizes a shared axle so that the arms work with each other and the tarp unrolls smoothly at the same rate of speed on both sides of the transport container. Furthermore, this invention does not require that a vehicle be running to operate the system. In this system, the tarp roller only adds about six inches to the total height of the vehicle. These and other advantages will be fully realized in more detail in the Detailed Description of the Invention.

SUMMARY OF INVENTION

This invention relates to a bolt-on covering system kit for transport containers on a vehicle comprising a bolt-on axle bolted to the underside of the vehicle by U-bolts, two straight, adjustable telescopic arms sharing said bolt-on axle, an electric hydraulic pump cylinder, a control unit bolted in an easily accessible tower, and a roll-out tarp. Each of the telescopic arms further comprises a proximal and distal end in relation to the bolt-on axle. The control unit further comprises remote controls with a tether. The roll-out tarp is located between the distal ends of the two telescopic arms. When the tarp is not in use, it rests on a shelf located above the transport container.

The control unit controls the movement of the telescopic arms. The electric hydraulic pump cylinders further comprises universal hydraulic lines connecting the electric hydraulic pump cylinders to the telescopic arms and remote controls. When a user activates the electric hydraulic pump cylinder using the remote control, the telescopic arms begin to move and unroll the tarp over the transport container. When a user is satisfied that the transport container is covered, the electric hydraulic pump cylinder will stop the movement of the telescopic arms through use of the remote control. The transport container can be uncovered by using the remote control to signal to the electric hydraulic pump cylinder to move back the telescopic arms and begin to roll the tarp. In order to initiate movement of the telescopic arms, the vehicle does not need to be running.

DETAILED DESCRIPTION OF THE DRAWINGS

FIG. 2 depicts view of the bolt-on kit without the tarp.

DETAILED DESCRIPTION OF THE PREFERRED EMBODIMENT

Figure 1A:
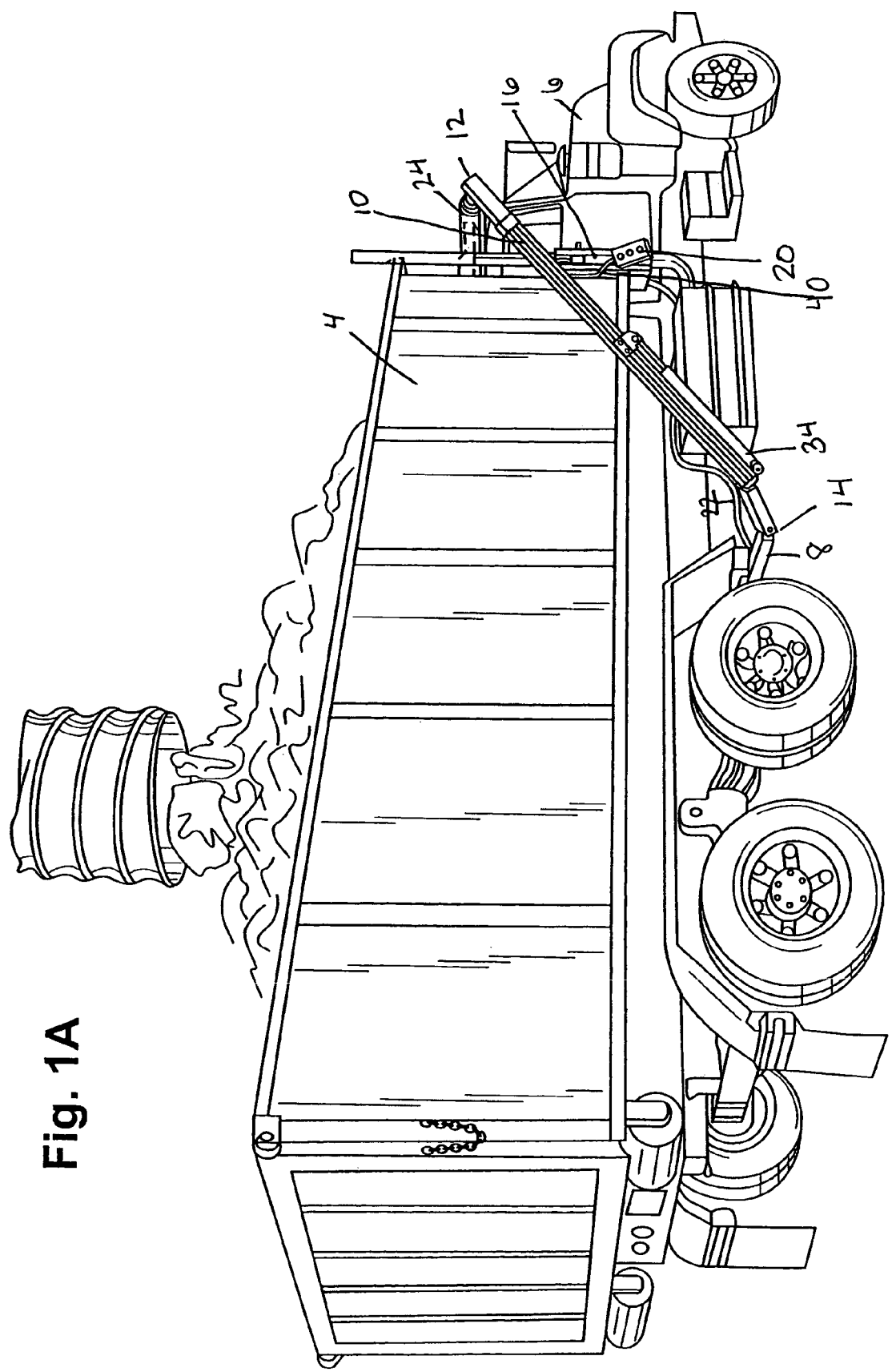
FIG. 1A depicts a vehicle with the tarp rolled, resting on its shelf.

A bolt-on covering system kit 2 for a transport container 4 on a vehicle 6 comprising a bolt-on axle 8 bolted to the underside of said vehicle 6, two straight, adjustable telescopic arms 10 sharing the bolt-on axle 8 and further comprising a proximal end 14 and a distal end 12, an electric hydraulic pump 18, a control unit 16 further comprising remote controls 20, and a roll-out tarp 24 located between the distal ends 12 of the telescopic arms 10. Preferably the electric hydraulic pump comprises two cylinders 34.

Figure 3:
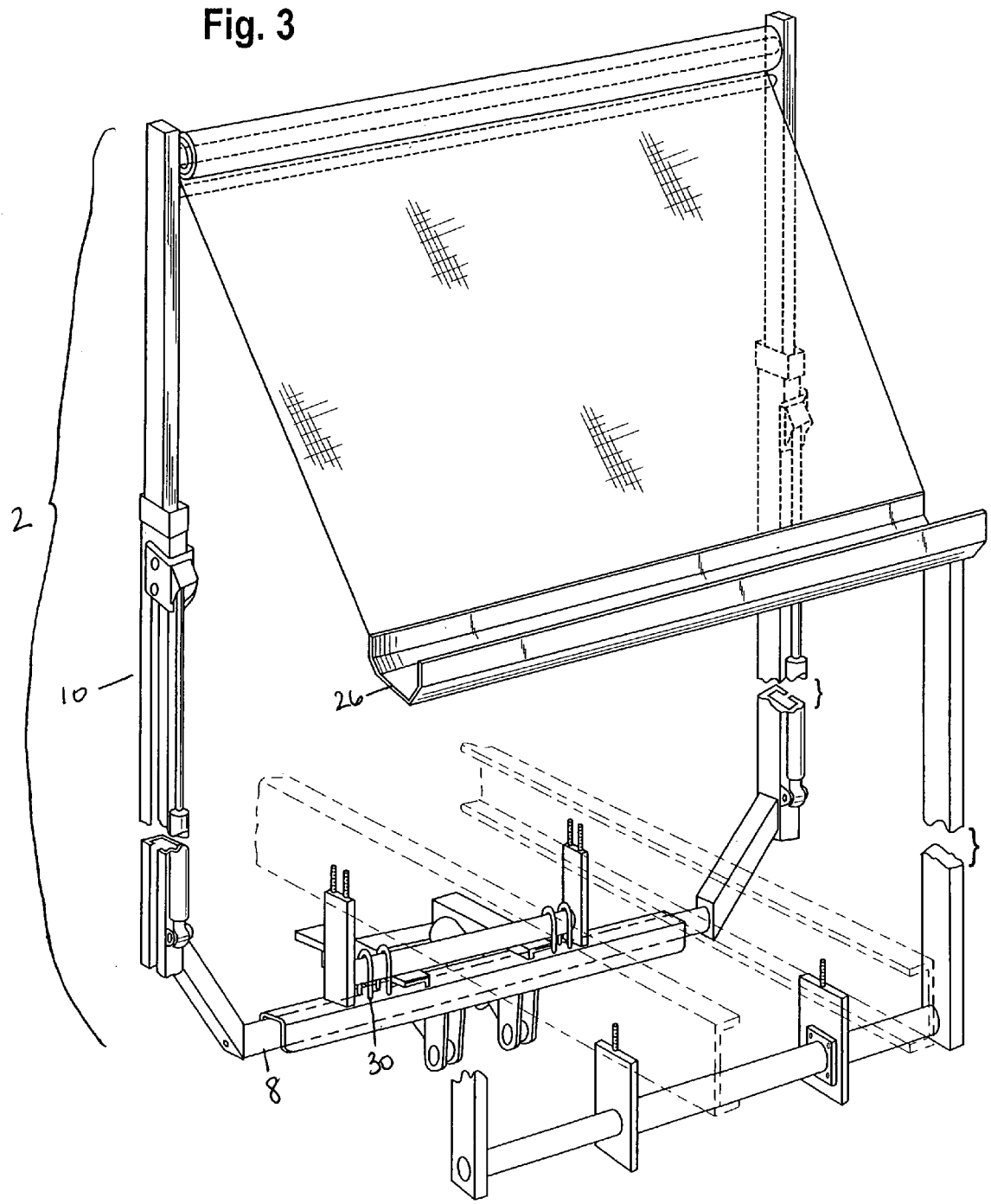
FIG. 3 depicts a view of the bolt-on kit with the tarp.
Figure 4:
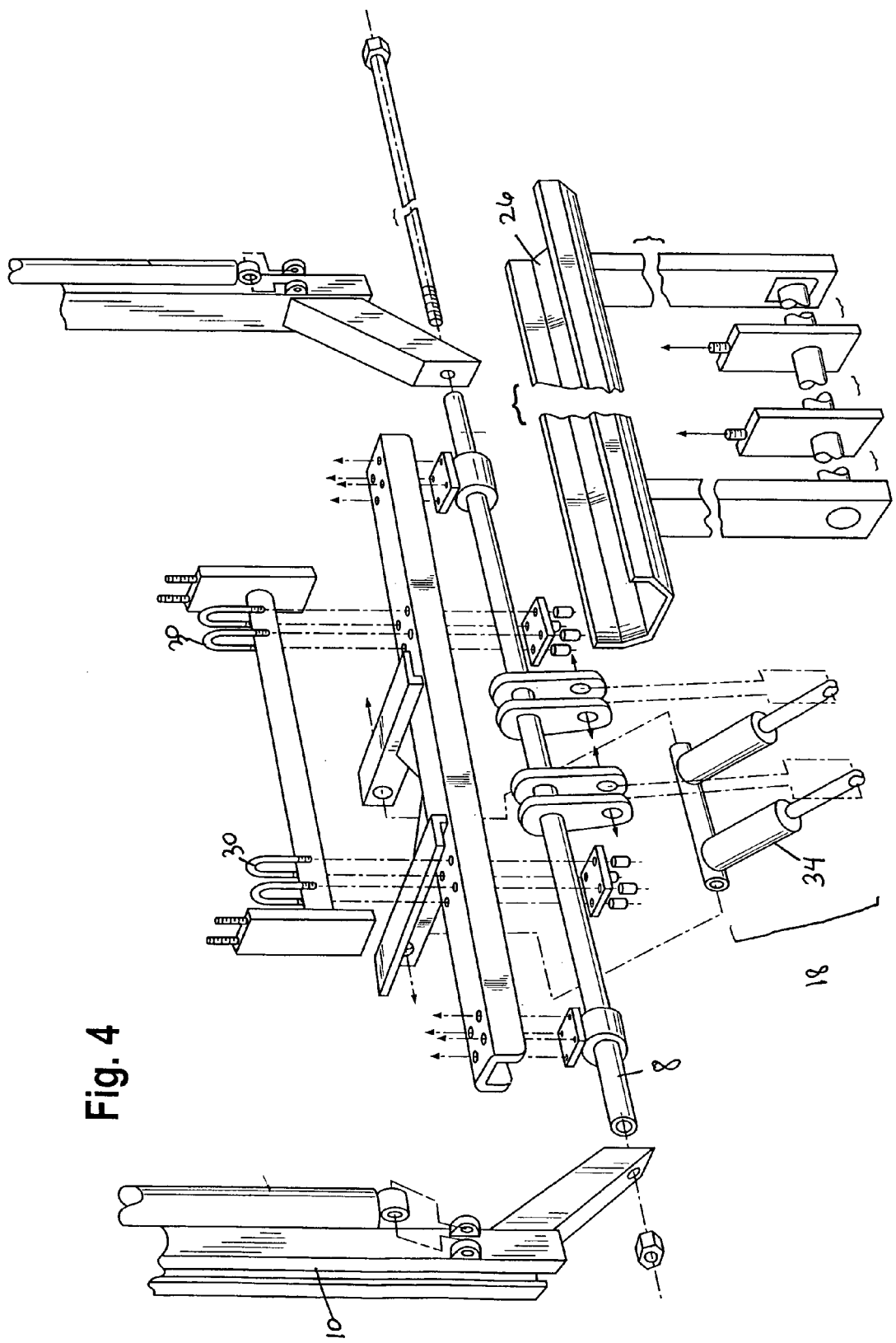
FIG. 4 depicts an exploded view of the bolt-on kit.

Typical covering systems for a transport container 4 require that a user weld all parts onto a vehicle 6. This welding process is extremely time consuming. By utilizing this bolt-on covering system kit 2, a user eliminates the need to weld or fabricate the parts onto the vehicle 6. This bolt-on covering system kit 2, as seen in FIGS. 2–4, comprises all parts necessary to safely fit a vehicle 6 with a covering system for the transport container 4 in a fraction of the time needed to fit a vehicle 6 with other covering systems while also addressing common problems that other systems encounter.

In fitting a vehicle 6 with this bolt-on covering system 2, a user must bolt the shared bolt-on axle 8 to underside of the vehicle 6 using U-bolts 30. By bolting the bolt-on axle 8 to the vehicle 6, no fender modification is needed, as is required in other systems to fit the axle to the vehicle 6.

Figure 1B:
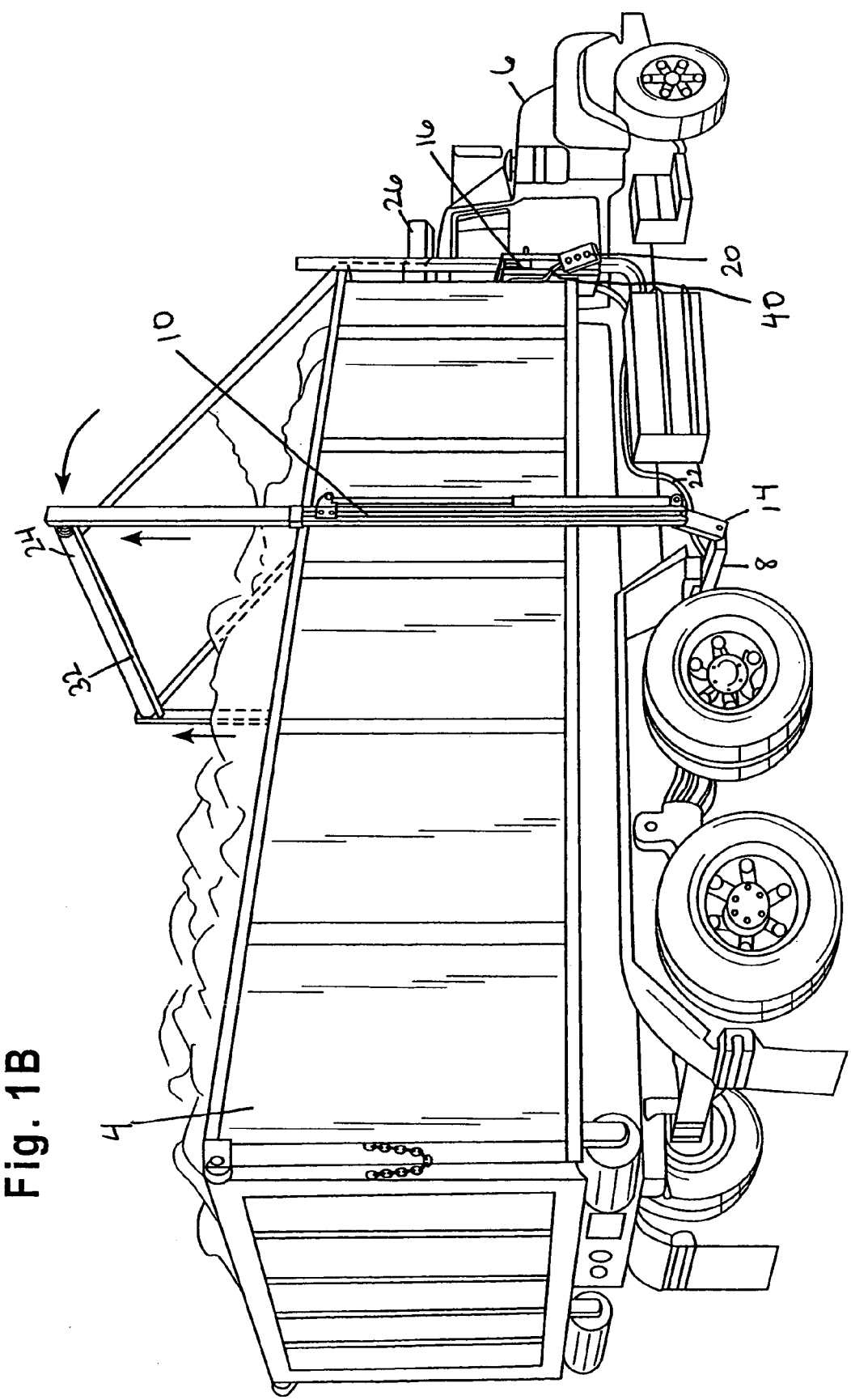
FIG. 1B depicts a vehicle with the tarp beginning to unroll with the telescopic arms moving together over the transport container.
Figure 1C:
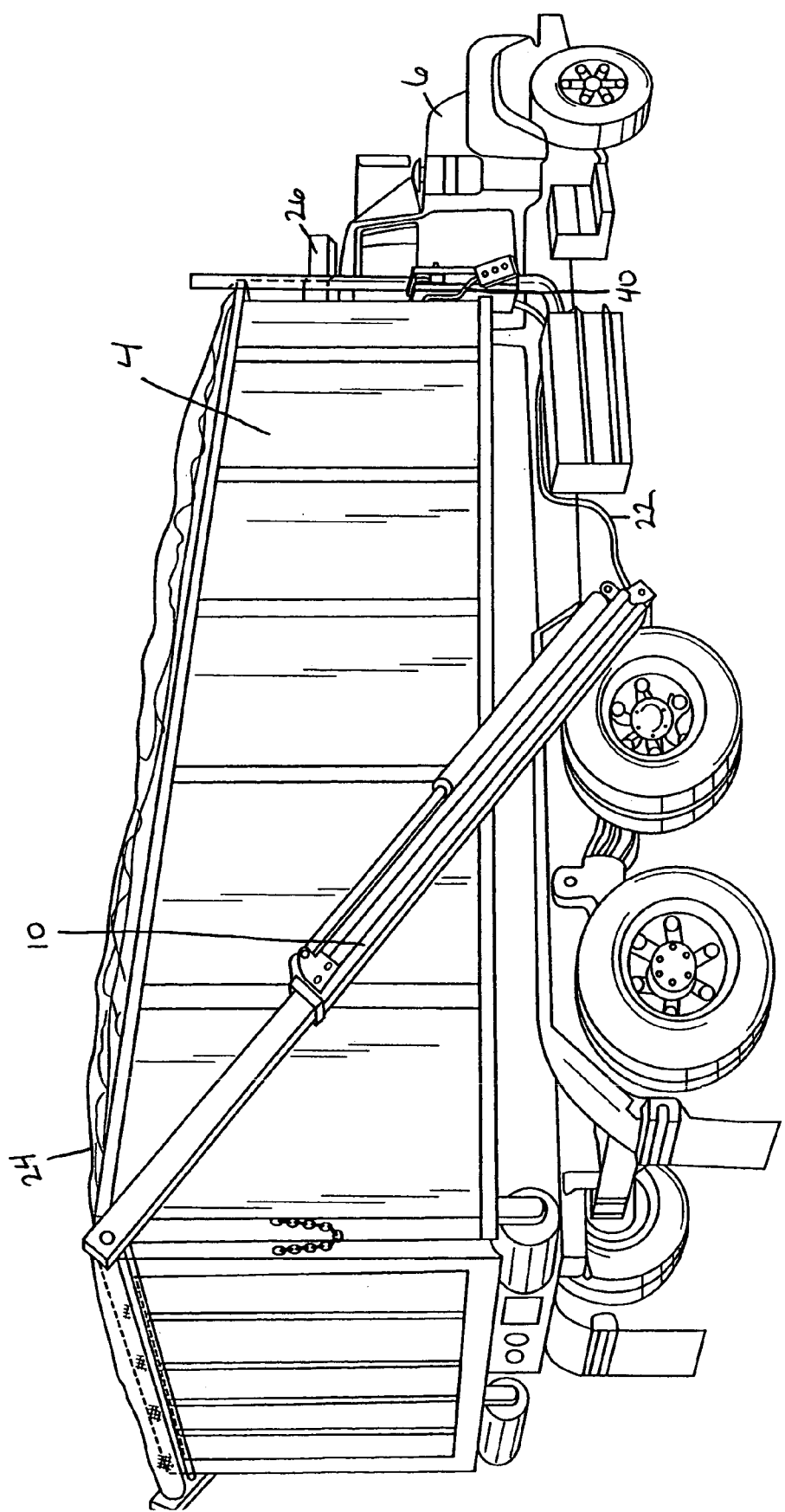
FIG. 1C depicts a vehicle fully covered by the tarp.

Once the bolt-on axle 8 is securely fixed to the underside of the vehicle 6, the control unit 16 further comprising remote controls 20 can be bolted to the vehicle 6 in an easily assessable location, preferably with a J bolt as opposed to a U bolt that other systems may employ. On a larger truck, the preferable location would be in front of the trailer behind the passenger cab so that the control unit 16 is flush with the passenger cab and does not increase the width of the truck, as seen in FIGS. 1A, 1B, and 1C. This control unit 16 does not have to be in a location where the user has to stand at the control unit 16 to operate the system; the user can stand away and get a better view of covering system operation to ensure that the tarp 24 is un-rolling or rolling smoothly.

The control unit 16 controls the movement of the telescopic arms 10. The electric hydraulic pump 18 is located under the vehicle 6 and attached to the bolt-on axle 8 in a position so that the cylinders 34 are safely secured and not in a position so as to not be too low to the ground. The electric hydraulic pump 18 utilizes universal hydraulic lines 22. This allows for easy part replacement with no additional cost that is usually associated with custom hydraulic lines. These hydraulic lines 22 connect the cylinders 34 to the telescopic arms 10 and to the remote controls 20.

The remote control 20 is connected to the control unit 16. This tether 40 allows for the user to stand away from the vehicle 6 for a better view and still be able to operate the electric hydraulic pump 18. Furthermore, to operate the control unit 16, the vehicle 6 does not have to be running. Since this system is simply connected to the battery source, the vehicle 6 can be off and the transport container 4 can still be covered or uncovered as needed.

The telescopic arms 10 are bolted to the shared bolt-on axle 8 at their proximal end 14. The hydraulic lines 22 lead from the cylinders 34 to the telescopic arms 10. The roll-out tarp 24 is bolted to the distal ends 12 of the telescopic arms 10. When a user desires to cover the top of a transport container 4, the remote controls 20 activate the electric hydraulic pump 18. The electric hydraulic pump 18 powers the movement of the telescopic arms 10 as the telescopic arms 10 move over the top of the transport container 4 unrolling the roll-out tarp 24. Since the telescopic arms 10 are adjustable, they will not extend out over the end of the transport container 4. The roll-out tarp 24 will only be extended as much or as little as is needed to cover the transport container 4. The bolt-on covering system kit 2 is also designed so that the roll-out tarp 24 and the telescopic arms 10 do not add much to the height of the transport container 4. As the telescopic arms 10 are extend and over the transport container 4, the bar 32 supporting the roll-out tarp 24 can be used to compact and push down any part of the load that may be protruding out over the top of the transport container 4. Existing covering systems can not perform this compacting motion. The telescopic arms 10 extending with the bar 32 is able to push down on the load with over one thousand pounds of force.

When the roll-out tarp 24 is not needed and the transport container 4 is to be uncovered, a user will simply activate the electric hydraulic pump 18 using the remote controls 20 and the telescopic arms 10 will begin to roll back the roll-out tarp 24. When the roll-out tarp 24 is not in use, it will rest on a shelf 26 located above the transport container 4.

Typically covering systems for trucks generally add about seven hundred to one thousand pounds to the weight of the truck. This added weight detracts from the weight of a load the truck can handle. This bolt-on covering system kit 2 is lightweight when compared to other systems. It is of great benefit to keep the added weight to a minimum.

This bolt-on covering system kit 2 streamlines the process of adding a covering system to a vehicle 6. Using this bolt-on covering system kit 2, a user can fit a vehicle 6 with a covering system in only a few hours. Repairs are easy to make as parts can simply be unbolted and replaced. When a vehicle 6 no longer needs to be outfitted with a covering system, the entire system can be removed easily with no harm to the vehicle 6. Welding these systems onto a vehicle can permanently change a vehicle. Using this bolt-on covering system kit 2, no changes need to be made to a vehicle 6. The covering system simply can be bolted to the vehicle 6 as is. This bolt-on covering system kit 2 saves a user time, labor, and expense with no loss of safety or desired use.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A bolt-on covering system kit for a transport container on a vehicle comprising:
    a bolt-on axle bolted to underside of said vehicle by U-bolts;
    two straight, adjustable telescopic arms sharing said bolt-on axle, each of said telescopic arms bolted to said bolt-on axle and further comprising a proximal end and a distal end in relation to said bolt-on axle;
    electric hydraulic pump further comprising at least one cylinder;
    a control unit bolted in an easily accessible tower with remote controls to control said electric hydraulic pump; and
    a roll-out tarp located between said distal ends of said telescopic arms.

2. The bolt on covering system kit as in claim 1, wherein the electric hydraulic pump comprises two cylinders.

3. The bolt on covering system kit as in claim 1, wherein said control unit controls the movement of said telescopic arms; said electric hydraulic pump further comprises hydraulic lines connecting said cylinder of said electric hydraulic pump to said telescopic arms and said control unit.

4. The bolt-on covering system kit as in claim 3, wherein said control unit further comprises a tether for the remote controls.

5. The bolt-on covering system kit as in claim 3, wherein activation of said electric hydraulic pump initiates movement of said telescopic arms; movement of arms unrolls said roll-out tarp over said transport container; when said transport container is sufficiently covered, said remote control will signal to said electric hydraulic pump to cease movement of said telescopic arms.

6. The bolt-on covering system kit as in claim 5, wherein said transport container is sufficiently covered, said transport container can be uncovered when said remote control signals to said electric hydraulic pump to reverse movement and roll said roll-out tarp.

7. The bolt-on covering system as in claim 5, wherein said roll-out tarp can compact contents of said transport container as said roll-out tarp is unrolled.

8. The bolt-on covering system kit as in claim 1, where said roll-out tarp sits on a shelf located above the transport container when the roll-out tarp is not being used.

9. The bolt-on covering system kit as in claim 1, wherein it is not required to have said vehicle running in order to operate said electric hydraulic pump.

* * * * *